(12) United States Patent
Burk et al.

(10) Patent No.: US 6,731,292 B2
(45) Date of Patent: May 4, 2004

(54) SYSTEM AND METHOD FOR CONTROLLING A NUMBER OF OUTSTANDING DATA TRANSACTIONS WITHIN AN INTEGRATED CIRCUIT

(75) Inventors: Wayne Eric Burk, San Jose, CA (US); Ewa M. Kubalska, San Jose, CA (US); Brian D. Emberling, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 226 days.

(21) Appl. No.: 10/092,016

(22) Filed: Mar. 6, 2002

(65) Prior Publication Data

US 2003/0169626 A1 Sep. 11, 2003

(51) Int. Cl.[7] .............................................. G06F 15/76
(52) U.S. Cl. ........................ 345/519; 345/520; 345/531
(58) Field of Search ................................ 345/519, 520, 345/531, 532, 559, 552, 545, 419, 542; 710/306, 305; 711/100, 105, 154

(56) References Cited

U.S. PATENT DOCUMENTS 5,859,989 A * 1/1999 Olarig et al. ............... 345/519
6,215,497 B1 * 4/2001 Leung ......................... 345/419
6,279,087 B1 * 8/2001 Melo et al. ................. 711/146
6,469,703 B1 * 10/2002 Aleksic et al. ............. 345/542
6,477,623 B2 * 11/2002 Jeddeloh ..................... 345/519
6,559,850 B1 * 5/2003 Strongin et al. ............ 345/520
6,624,817 B1 * 9/2003 Langendorf ................. 345/520
6,630,936 B1 * 10/2003 Langendorf ................. 345/520
2003/0046473 A1 * 3/2003 Dobson et al. ............. 710/306

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

An integrated circuit may include several components, one or more interfaces, an interconnect (e.g., a bus), and a controller. The components may each be configured to assert a read request to read data stored externally to the integrated circuit. The interfaces may be configured to output the read request asserted by one of the components and to receive data in response to outputting the request. The interconnect may be coupled to perform one or more data transactions to transmit the data from one of the interfaces to one or more of the components. In response to the read request asserted by one of the components, the controller may inhibit performance of a read transaction initiated by the read request dependent upon a comparison of a total number of outstanding data transactions to a maximum allowable number of outstanding data transactions.

31 Claims, 10 Drawing Sheets

SYSTEM AND METHOD FOR CONTROLLING A NUMBER OF OUTSTANDING DATA TRANSACTIONS WITHIN AN INTEGRATED CIRCUIT

BACKGROUND OF THE INVENTION

1. Field of the Invention

This invention relates generally to the field of integrated circuits and, more particularly, to contolling the number of outstanding read transactions allowed within an integrated circuit used in a graphics system.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modem graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

Many graphics systems include one or more integrated circuits arranged on a printed circuit board. Some of the integrated circuits may be configured to operate on various different formats of graphics information (e.g., pixels, texels, and graphics primitives) that are supplied from several different sources (e.g., frame buffers, texture buffers, a host computer system, and/or another processing circuit). Because the bus or buses internal to an integrated circuit may be configured differently than the bus or buses connecting that integrated circuit to other circuits, it may take multiple internal data transactions to satisfy a single read to a source outside of the integrated circuit. Furthermore, reads for different types of data may create different numbers of internal data transactions. Because each external read may initiate several internal data transactions, an integrated circuit's performance may be reduced if too many reads are initiated.

SUMMARY

Various embodiments of systems and method for limiting the number of outstanding read transactions within an integrated circuit are disclosed. In one embodiment, an integrated circuit may include several components, one or more interfaces, an interconnect (e.g., a bus), and a controller. The components may each be configured to assert a read request to read data stored externally to the integrated circuit. The interfaces may be configured to output the read request asserted by one of the components and to receive data in response to outputting the request. The interconnect may be coupled to perform one or more data transactions to transmit the data from one of the interfaces to one or more of the components. In response to the read request asserted by one of the components, the controller may inhibit performance of a read transaction initiated by the read request dependent upon a comparison of a total number of outstanding data transactions to a maximum allowable number of outstanding data transactions.

BRIEF DESCRIPTION OF THE DRAWINGS

A better understanding of the present invention can be obtained when the following detailed description is considered in conjunction with the following drawings, in which.

Figure 1:
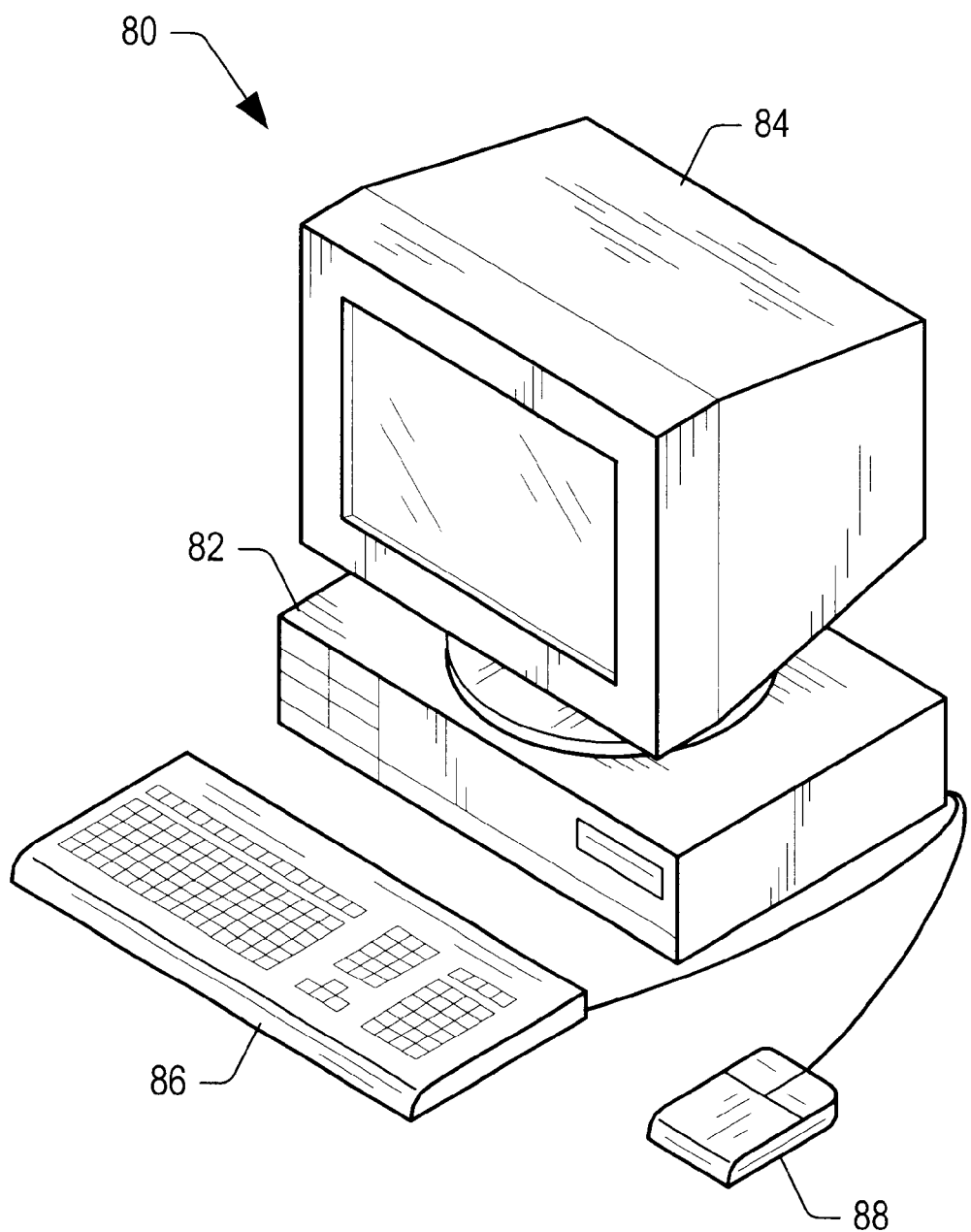
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
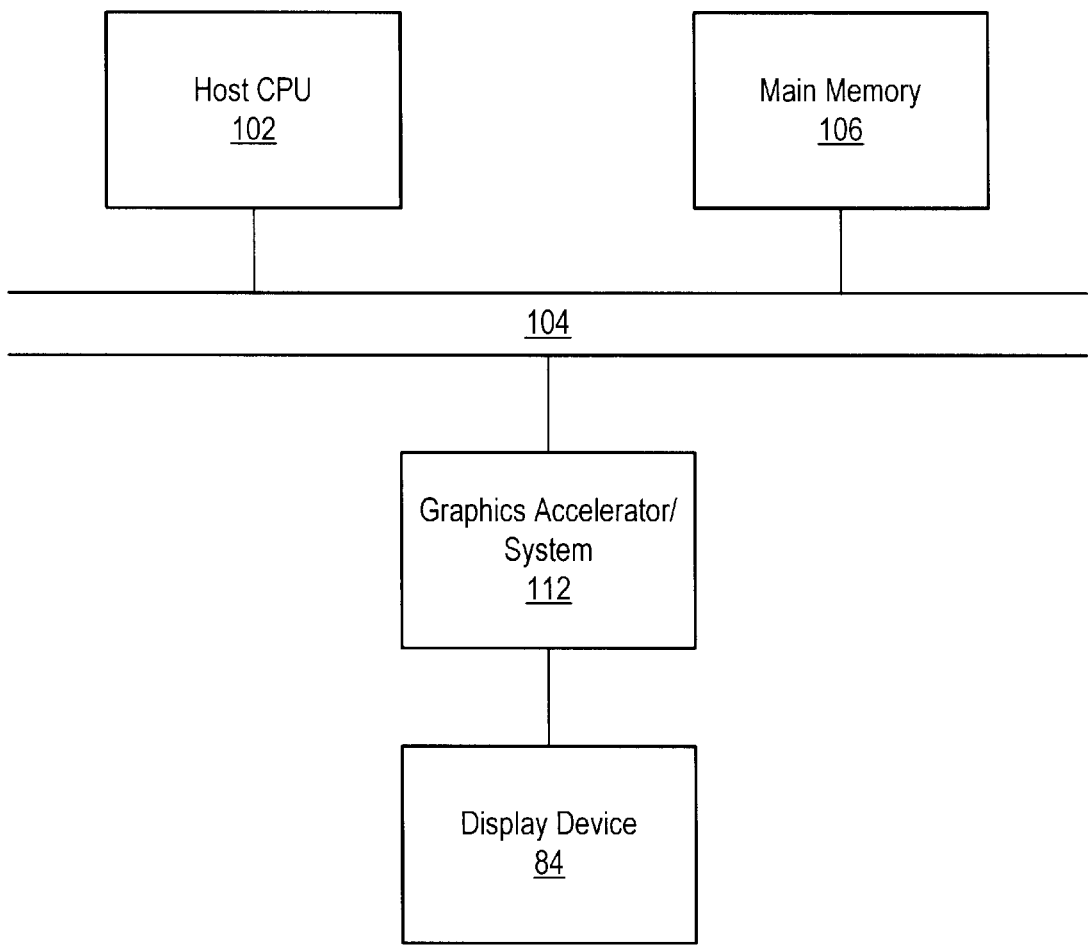
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
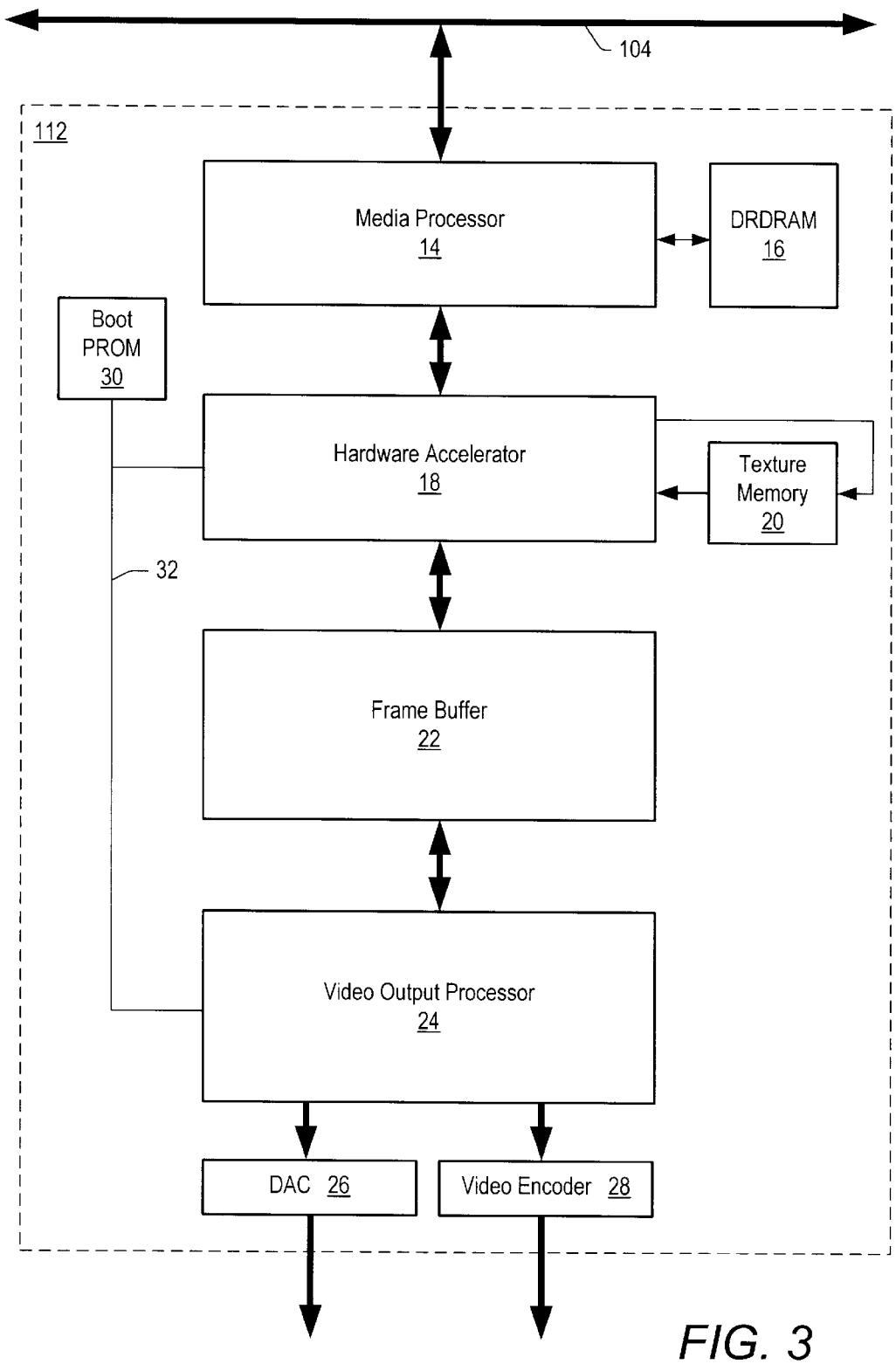
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
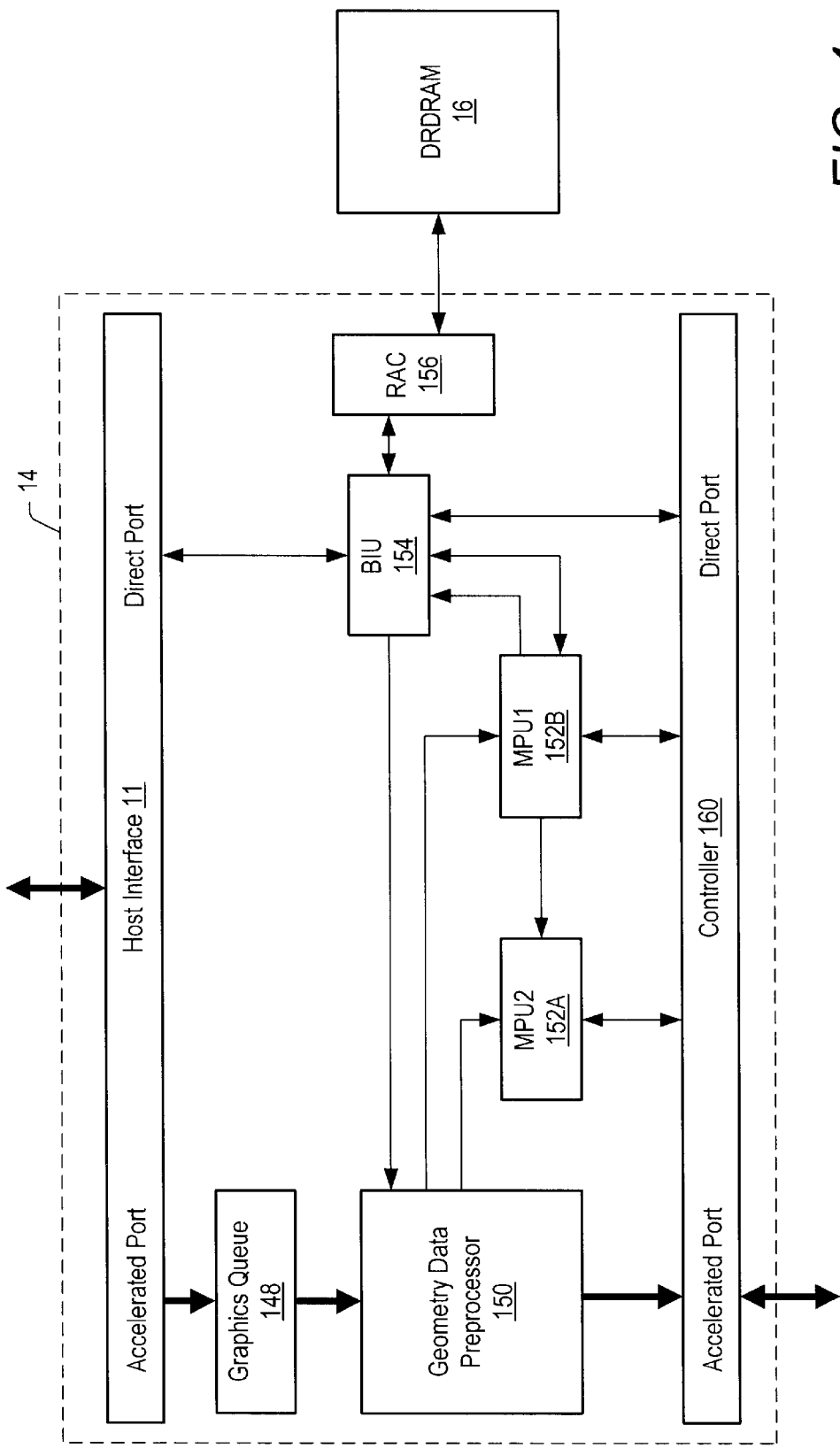
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
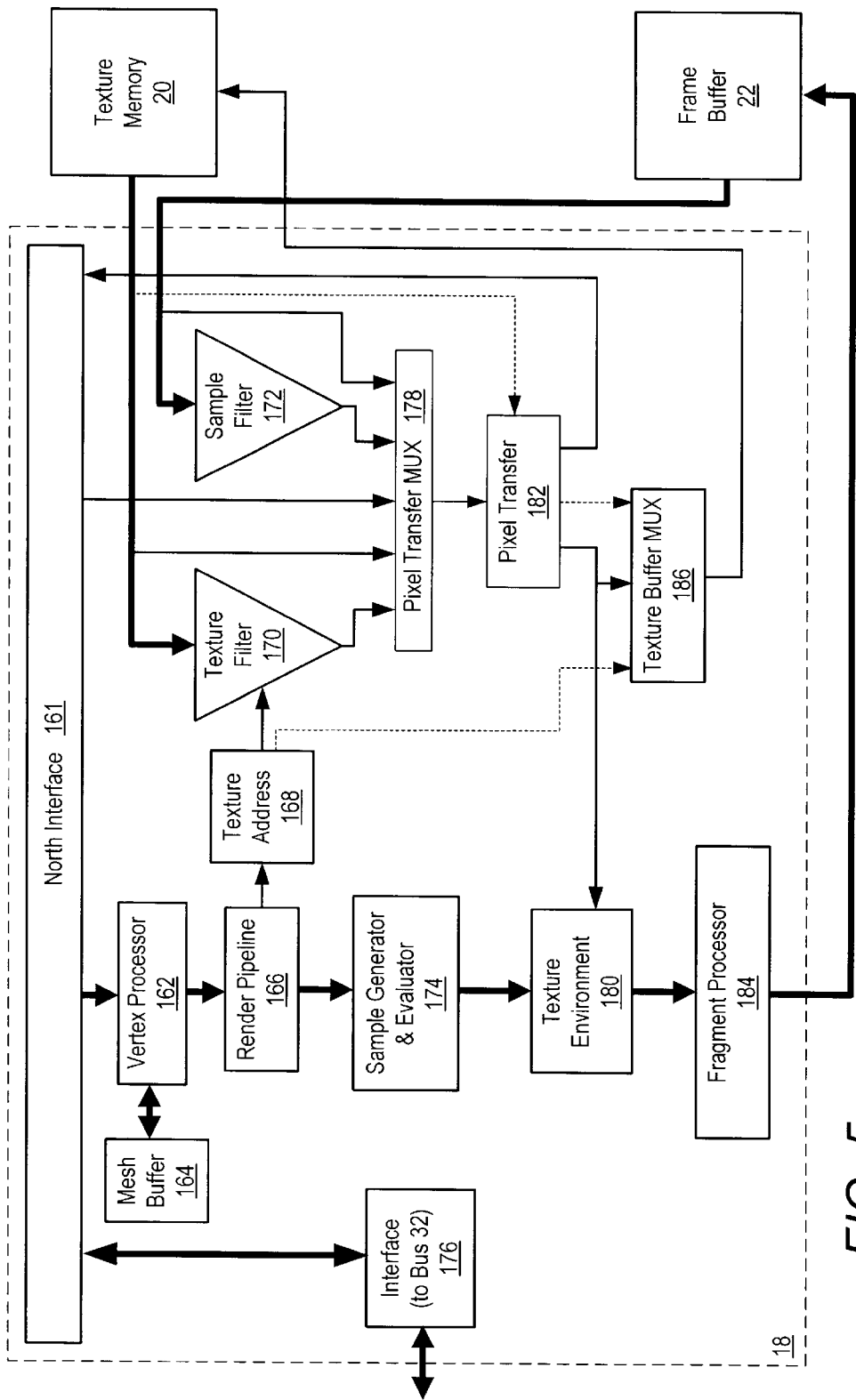
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e., transparency);

z (i.e., depth); and s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
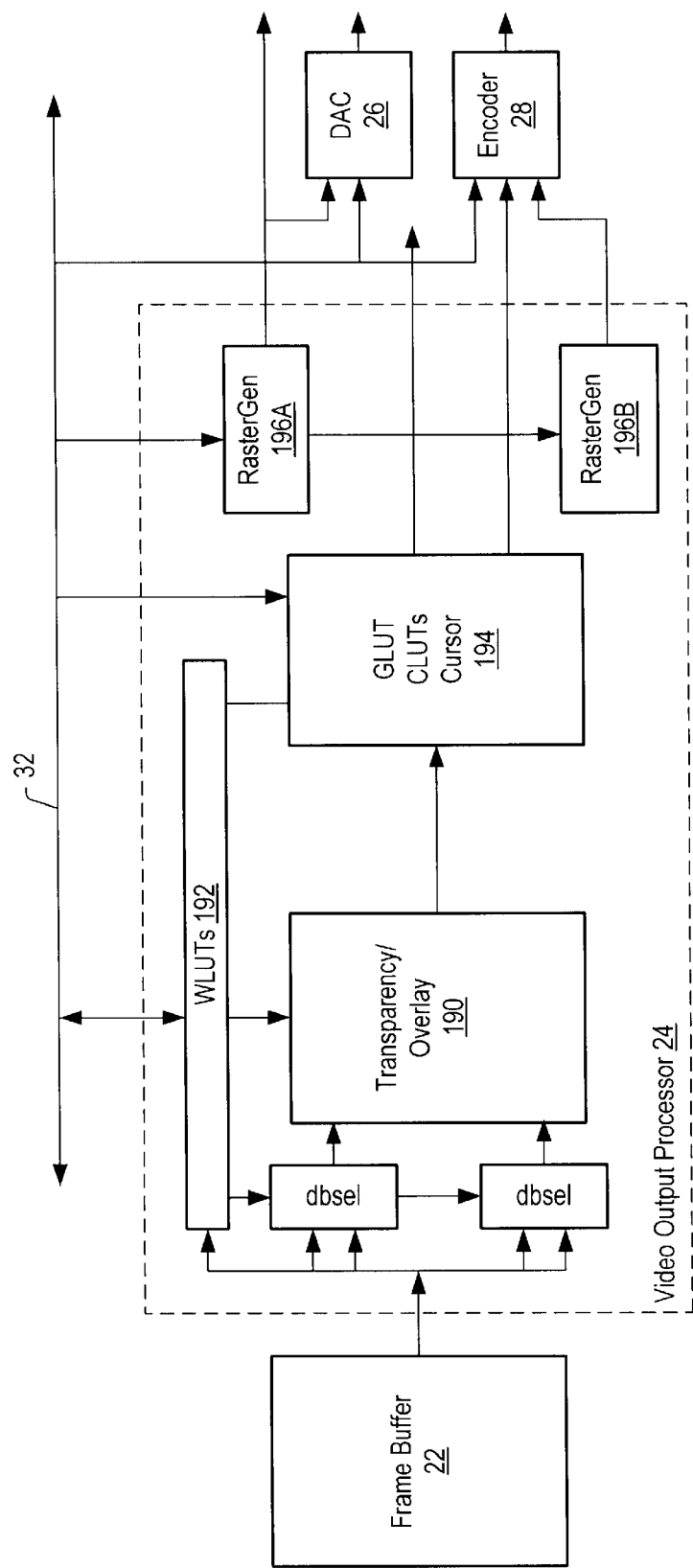
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
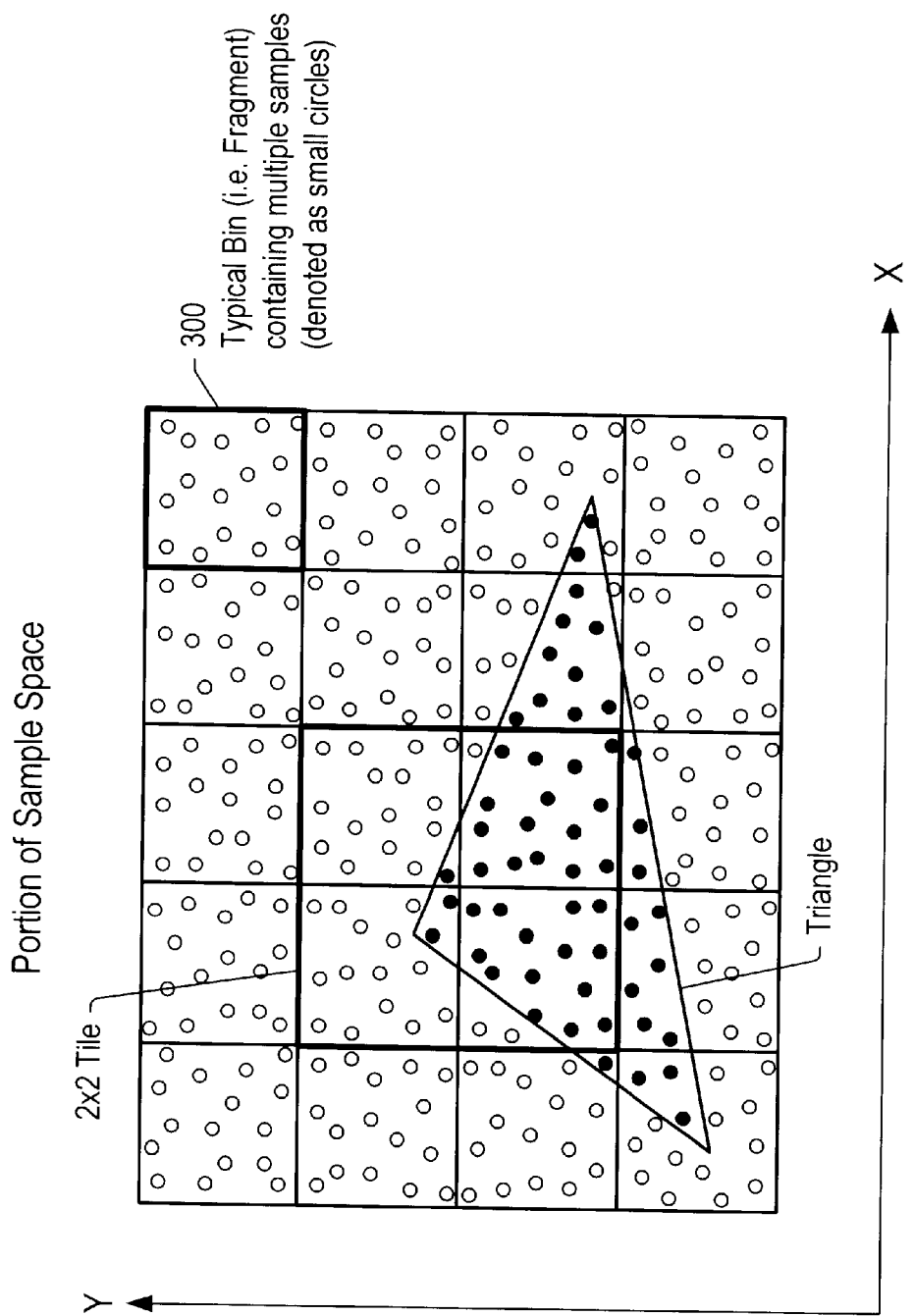
FIG. 7 shows how samples may be organized into bins in one embodiment.

Sample-to-Pixel Processing Flow—FIG. 7

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and/or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Limiting Outstanding Data Transactions

Figure 8:
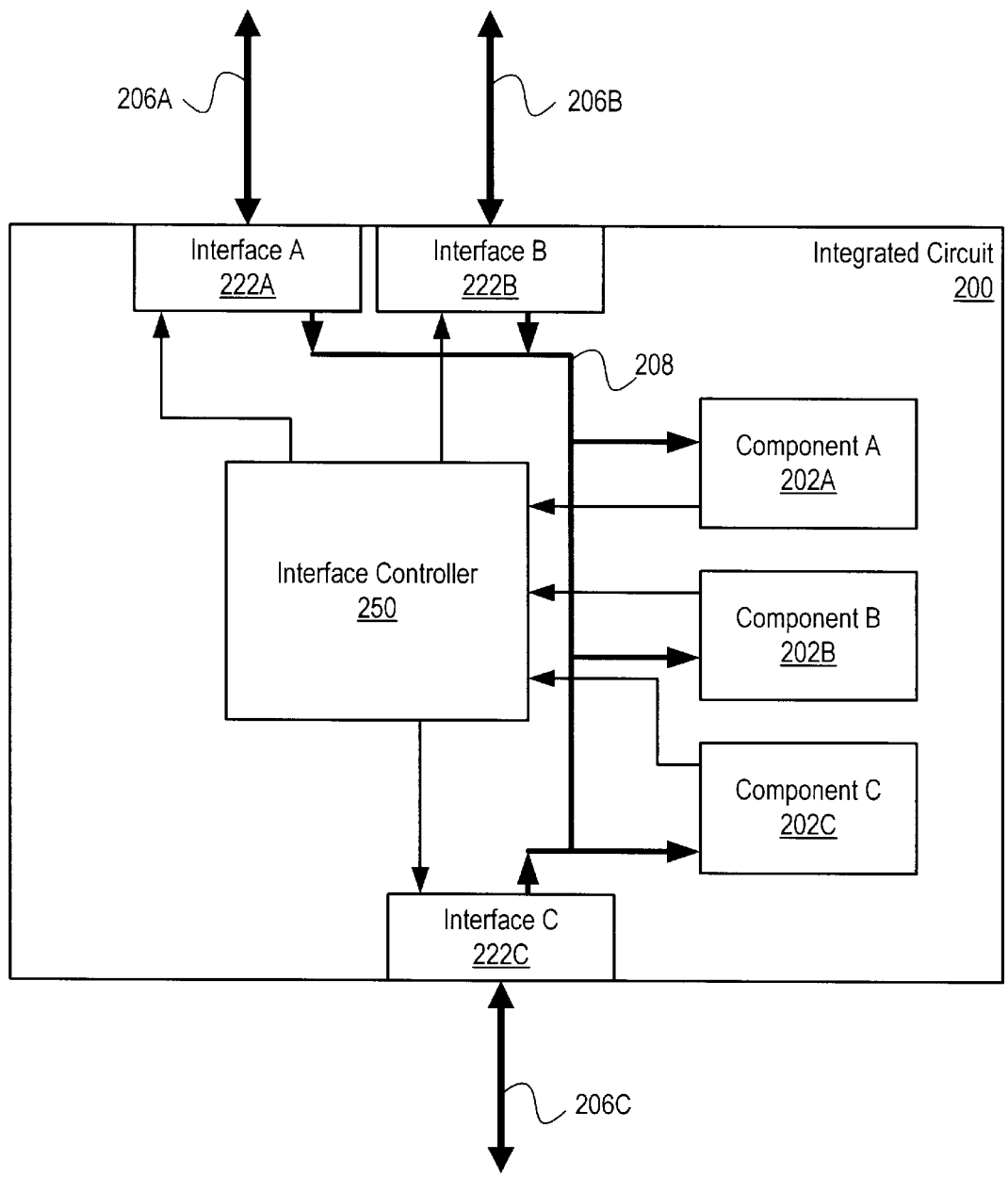
FIG. 8 is a block diagram of one embodiment of an integrated circuit.

One or more of the processing subsystems included in a graphics system may be implemented as an integrated circuit. For example, in one embodiment, the media processor and the hardware accelerator may each be implemented as an integrated circuit. FIG. 8 shows a block diagram of one embodiment of such an integrated circuit 200. Various components 202A, 202B, and 202C (collectively, components 202) within such an integrated circuit may operate on graphics data (e.g., graphics primitives, pixels, and/or texels) as described above. Data may be passed between the integrated circuit 200 and other components in the graphics system (e.g., another processing subsystem and/or memory devices such as frame and texture buffers) as well as between the integrated circuit and other components in a computer system (e.g., a host processor 102 and/or system memory 106) on one or more buses 206A, 206B and/or 206C (collectively, buses 206). The integrated circuit may include one or more interfaces 222A, 222B, 222C (collectively, interfaces 222) that each interface to one or more of the buses 206. The integrated circuit 200 may include one or more internal interconnects (e.g., buses 208 or point-to-point connections) that allow components 202 within the integrated circuit to transfer data between each other and between external components. As used herein, performance of a read transaction involves providing a read request asserted by one of the components 202 to one of the interfaces 222 and transmitting the requested data from the interface 222 to the component 202. Transmitting the requested data may take one or more data transactions on the internal bus 208.

Each read initiated within the integrated circuit 200 by one of the components 202 that targets data located external to the integrated circuit 200 may involve one or more data transactions on the internal buses 208 or other interconnects. The number of data transactions taken to satisfy each read request may vary depending on the type of data requested (e.g., pixels, texels, primitives), the granularity of the requested data (e.g., a system may support multiple pixel sizes), the configuration of the external bus on which the specified data will be transmitted relative to the configuration of the internal bus 208 or other interconnect (e.g., the external bus may provide 128 bits per data transaction while the internal bus may transmit 32 bits per data transaction), whether any data packing or unpacking takes place within one of the interfaces 222 before the data is transmitted on the internal bus 208, etc. Different types of read requests may include single read requests (e.g., requesting 128 bits), block read requests (e.g., requesting 64 bytes), and register read requests (e.g., requesting 4 bytes).

If there are too many outstanding read requests, the number of internal data transactions may increase until the internal bus 208 becomes congested, leading to performance degradation and potentially causing a deadlock condition in which two or more data transactions block each other's progress. An interface controller 250 may control the number of outstanding internal data transactions in order to decrease the risk of deadlock and/or other performance degradation. Outstanding internal data transactions are data transactions that have not yet been performed and that are initiated by a read request. The interface controller 250 may control the number of outstanding data transactions by intercepting new read requests asserted by all or some of the components 202 in the integrated circuit. The interface controller 250 may selectively inhibit performance of certain read transactions (e.g., by delaying the time at which the read requests are provided to an interface 222 to be transmitted to a target external device) based upon the number of currently outstanding data transactions in order to limit the number of outstanding data transactions at any given time. For example, if too many data transactions are outstanding, the interface controller 250 may delay providing a read request to an interface 222 until the number of outstanding data transactions has decreased to an acceptable level.

Figure 9:
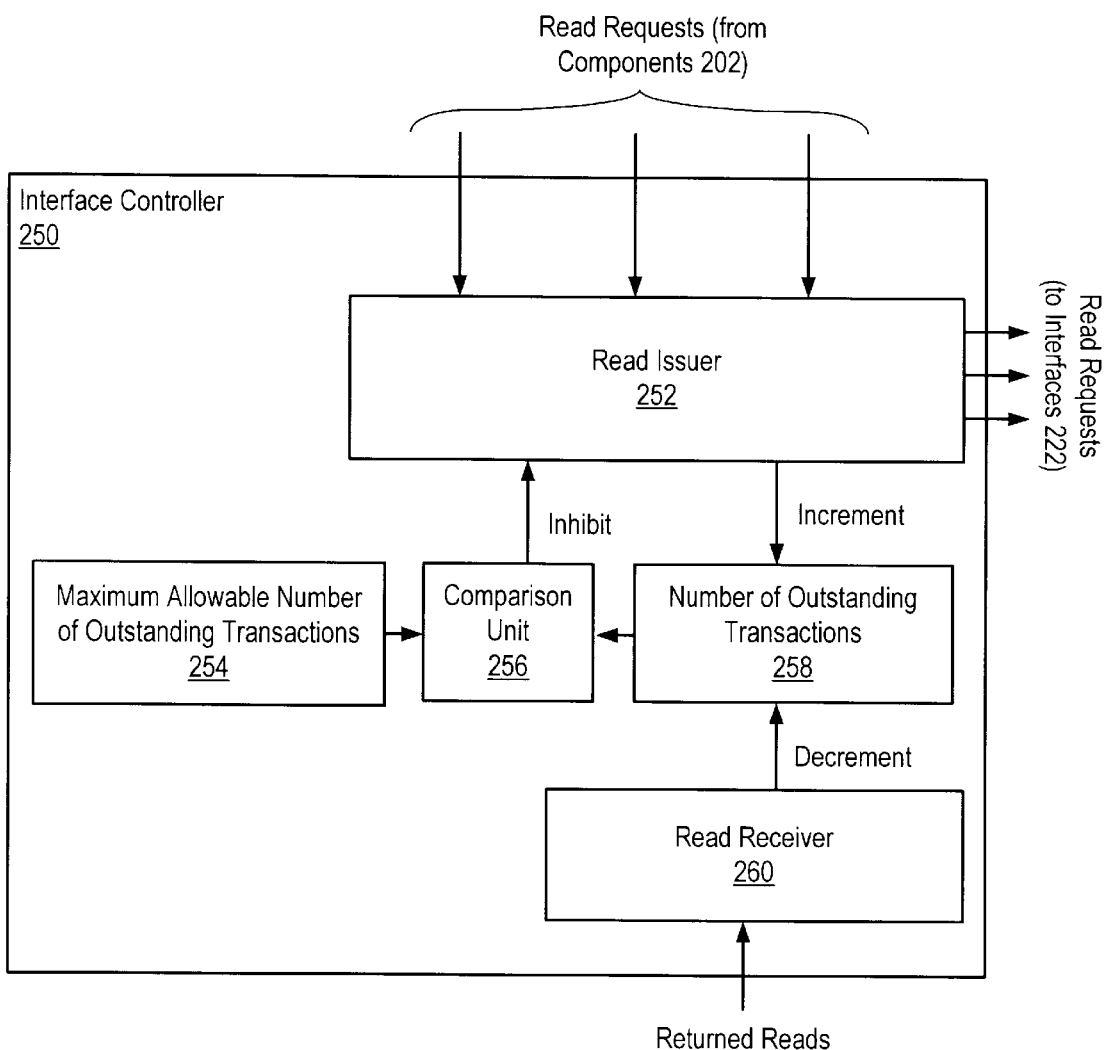
FIG. 9 is a block diagram one embodiment of an interface controller.

FIG. 9 shows one embodiment of an interface controller 250. As shown, the interface controller 250 receives read requests from several components 202 within an integrated circuit. The interface controller also provides read requests to one or more interfaces 222. The interface controller 250 includes a read issuer 252, a register 254 that stores a value indicative of the maximum allowable number of outstanding data transactions, a register 258 configured to store a value indicative of the current number of outstanding data transactions, a comparison unit 256, and a read receiver 260.

In one embodiment, the read issuer 252 is configured to receive read requests and selectively issue or inhibit those read transactions initiated by those requests based upon the current number of outstanding data transactions. Upon receiving a read request from a component, the read issuer 252 may determine the number of data transactions that will be initiated by that request (e.g., by accessing a table that stores data indicative of a number of data transactions initiated for different types of read requests). The read issuer 252 may then add that number to the number of outstanding data transactions stored in register 258 (e.g., register 258 may be a counter and the read issuer may increment the counter a number of times equal to the number of data transactions). The comparison unit may compare the values in registers 254 and 258. If the number of outstanding data transactions (which in this embodiment includes the data transactions that will be initiated by the current request) exceeds the maximum number of allowable data transactions, the comparison unit 256 may assert an inhibit signal to the read issuer 252. In response to the inhibit signal, the read issuer 252 may temporarily inhibit performance of the read transaction initiated by the read request (e.g., by buffering the read request and delaying to provide the read request to an interface 222). The read issuer 252 may cease inhibiting the read transaction when the number of currently outstanding data transactions has decreased (e.g., when the comparison unit deasserts the inhibit signal). Thus, a read transaction may be temporarily inhibited until the risk of congestion and/or deadlock has decreased to an acceptable level.

Note that in some embodiments, the read issuer 252 may not be coupled to provide read requests to interfaces 222. In one such embodiment, the read issuer 252 may inhibit performance of a read transaction by asserting (or not asserting) a control signal to an interface 222 so that the interface 222 is not enabled to accept the corresponding read request. The read issuer 252 may also provide a control signal to the requesting component indicating whether the read request was enabled so that the requesting component knows to reassert the request at a later time. Other embodiments may inhibit performance of read transactions in other ways.

In one alternative embodiment, the read issuer 252 may allow a read request to be sent out to a targeted external device. When data is returned to the integrated circuit in response to the read request, the read issuer may stall or cancel the data transactions used to convey the data to the requesting component 202 over the internal bus 208 if the number of outstanding data transactions is greater than the maximum allowable number of outstanding data transactions. If the data transactions are cancelled, the read issuer 252, the interface 222, or the requesting component 202 may reassert the read request to the external device. Accordingly, in some embodiments, the read issuer 252 may inhibit performance of a read transaction by inhibiting performance of the data transactions used to satisfy a read request.

In some embodiments, the read issuer 252 may be configured to buffer several received read requests (e.g., in a queue). In one embodiment, if an earlier-received read request is inhibited, any later-received read requests may also be inhibited, even if those requests initiate fewer internal data transactions than the earlier transaction initiates. In other embodiments, some read requests may be allowed to pass earlier read requests.

The read receiver 260 is configured to receive an indication of each data transaction that occurs as part of a read transaction in the integrated circuit 200. Such an indication may be provided by an interface 222, a recipient component 202, and/or an internal bus 208 or interconnect. As each data transaction completes, the read receiver 260 may decrement the number of outstanding data transactions in register 258.

In one embodiment, the read issuer 252 and the read receiver 260 may each be implemented as a state machine.

In some embodiments, the register 254 storing the maximum number of allowable data transactions may be programmable. Thus, the maximum number of allowable data transactions may be tuned to improve the performance of an integrated circuit. If too few outstanding data transactions are allowed, the integrated circuit's performance may be degraded. As mentioned previously, if too many outstanding data transactions are allowed, deadlock conditions may arise. Thus, by providing a programmable register 254, the number of outstanding data transactions may be increased or decreased to meet the performance needs of a particular application. The value to use for a particular application may be selected by trying different values, running various tests and/or benchmarks with each of those register values, and comparing the performance of the system for the different values.

Figure 10:
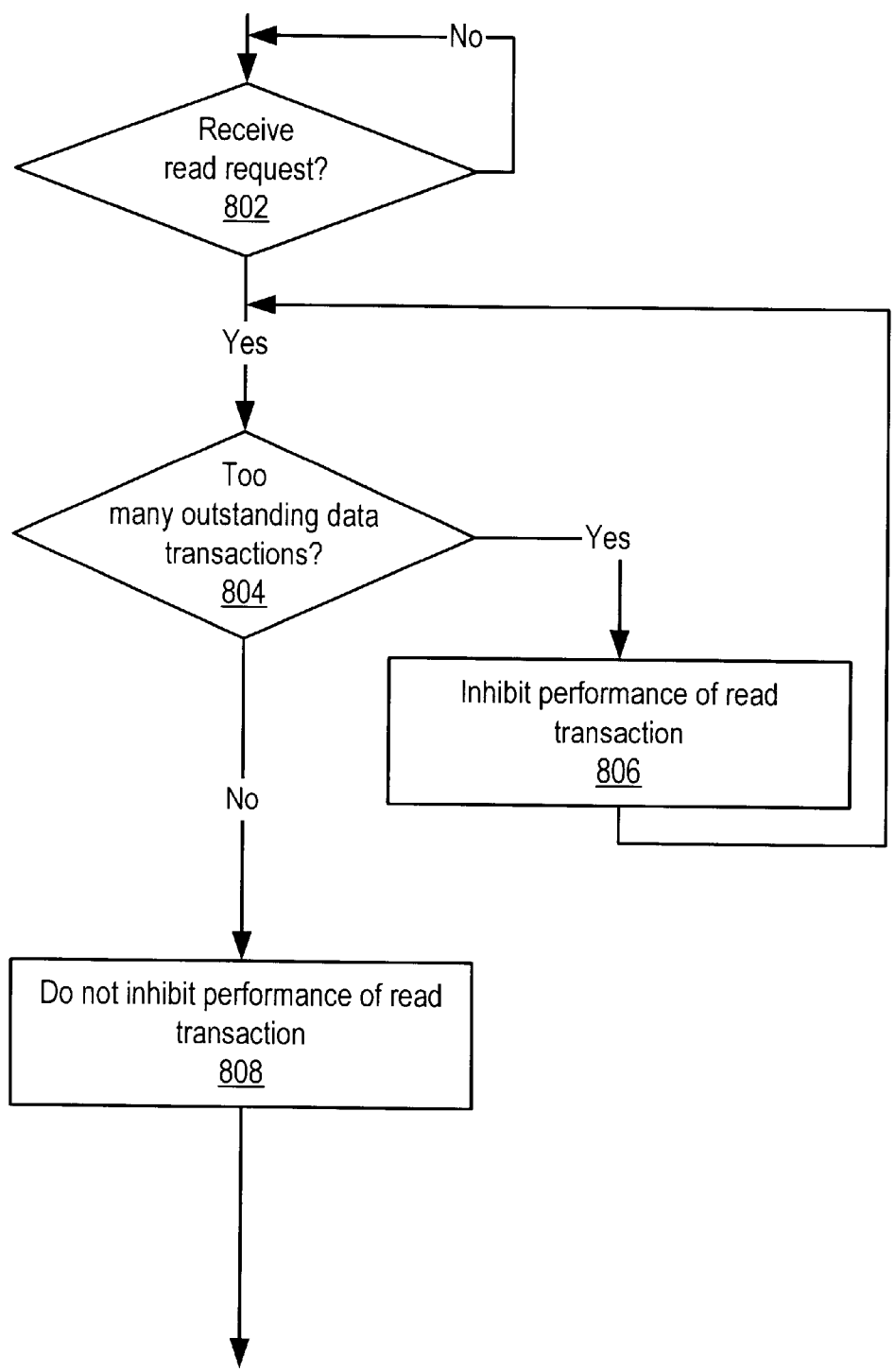
FIG. 10 is a flowchart of one embodiment of a method of operating an integrated circuit.

FIG. 10 shows one embodiment of a method of controlling the number of outstanding data transactions within an integrated circuit. If a read request is received at 802 but too many data transactions are currently outstanding, as indicated at 804, a read transaction may be inhibited, as shown at 806. If there are not too many outstanding read transactions, the read transaction may not be inhibited, as shown at 808.

Determining whether too many read transactions are currently outstanding may involve adding a number of data transactions that will be initiated by the read request received at 802 to a number of currently outstanding data transactions. The sum may be compared to a maximum allowable number of outstanding data transactions. If the sum is greater than (or in some embodiments, greater than or equal to) the maximum allowable number of outstanding data transactions, the current read transaction may be inhibited. As pending transactions complete, the number of currently outstanding data transactions may be decremented. When the number of currently outstanding data transactions has decreased so that the sum is less than the maximum allowable number of outstanding data transactions, the read transaction initiated by the request received at 802 may no longer be inhibited.

In one embodiment, a read transaction may be inhibited by delaying to provide the read request to an interface that interfaces with an external component. In another embodiment, a read transaction may be inhibited by asserting or deasserting a control signal indicating that the read request should be cancelled or delayed. This control signal may be provided to both an interface and a requesting component within the integrated circuit in one embodiment. In response to the assertion or deassertion of the control signal, the requesting component may be configured to reassert the request at a later time (e.g., after the expiration of a timer). Other methods of temporarily inhibiting performance of a read transaction may be used in other embodiments. For example, in one embodiment, a read transaction may be inhibited by delaying or canceling the data transactions used to transmit requested data from an interface to an internal component over an internal bus.

Although the above embodiments have been described in considerable detail, alternative embodiments are possible and contemplated. For example, while several exemplary embodiments have been described in the context of a graphics system, note that alternative embodiments may be used in other computing systems. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. An integrated circuit comprising:
   a plurality of components, wherein each of the components is configured to assert a read request to read data stored externally to the integrated circuit;
   one or more interfaces coupled to the plurality of components, wherein each interface is configured to output the read request asserted by one of the plurality of components and to receive data in response to outputting the request;
   an interconnect coupled to perform one or more data transactions to transmit the data from one of the one or more interfaces to one or more of the plurality of components;
   a controller coupled to the plurality of components and the one or more interfaces, wherein in response to the read request asserted by one of the plurality of components, the controller is configured to inhibit performance of a read transaction initiated by the read request dependent upon a number of outstanding data transactions.

2. The integrated circuit of claim 1, wherein the interconnect comprises a bus.

3. An integrated circuit comprising:
   a plurality of components, wherein each of the components is configured to assert a read request to read data stored externally to the integrated circuit;
   one or more interfaces coupled to the plurality of components, wherein each interface is configured to output the read request asserted by one of the plurality of components and to receive data in response to outputting the request;
   an interconnect coupled to perform one or more data transactions to transmit the data from one of the one or more interfaces to one or more of the plurality of components;
   a controller coupled to the plurality of components and the one or more interfaces, wherein in response to the read request asserted by one of the plurality of components, the controller is configured to inhibit performance of a read transaction initiated by the read request dependent upon a comparison of a total number of outstanding data transactions to a maximum allowable number of outstanding data transactions.

4. The integrated circuit of claim 3, wherein the controller is configured to inhibit performance of the read transaction by inhibiting receipt of the read request by one of the one or more interfaces.

5. The integrated circuit of claim 4, wherein the controller is configured to inhibit performance of the read transaction by buffering the read request until the total number of outstanding data transactions is less than or equal to the maximum allowable number of outstanding data transactions.

6. The integrated circuit of claim 3, further comprising a register configured to store data indicative of the maximum allowable number of outstanding data transactions.

7. The integrated circuit of claim 4, wherein the data stored in the register has a programmable value.

8. The integrated circuit of claim 3, wherein if the total number of outstanding transactions is less than the maximum allowable number of outstanding data transactions, the controller is configured to not inhibit performance of the read transaction.

9. The integrated circuit of claim 3, wherein different read transactions include different numbers of data transactions on the interconnect.

10. The integrated circuit of claim 3, wherein the controller is configured to determine a number of data transactions initiated by the read request and to add the number of data transactions to a current number of outstanding data transactions to produce the total number of outstanding data transactions.

11. The integrated circuit of claim 3, wherein the controller is configured to increase the total number of outstanding data transactions by a number of data transactions initiated by the read request in response to not inhibiting the read transaction.

12. The integrated circuit of claim 3, wherein the controller is configured to decrease the total number of outstanding data transactions each time a data transaction is performed.

13. The integrated circuit of claim 3, wherein the integrated circuit is configured for use in a graphics system.

14. The integrated circuit of claim 13, wherein a first one of the interfaces is configured to interface to a frame buffer.

15. The integrated circuit of claim 13, wherein a first one of the interfaces is configured to interface to a texture buffer.

16. The integrated circuit of claim 3, wherein the controller is configured to inhibit performance of the read transaction by inhibiting performance of the data transactions.

17. The integrated circuit of claim 3, wherein the interconnect comprises a bus.

18. A method of operating an integrated circuit, the method comprising:
a component included in the integrated circuit asserting a read request for data stored outside of the integrated circuit, wherein the read request initiates a read transaction, wherein the read transaction includes one or more data transactions on an interconnect internal to the integrated circuit; and
inhibiting performance of the read transaction if a number of outstanding data transactions is greater than a maximum allowable number of outstanding data transactions.

19. The method of claim 18, wherein said inhibiting comprises inhibiting receipt of read request by an interface included in the integrated circuit.

20. A method of claim 19, wherein said inhibiting receipt comprises buffering the read request until the number of outstanding data transactions is less than or equal to the maximum allowable number of outstanding data transactions.

21. The method of claim 18, further comprising reading data indicative of the maximum allowable number of outstanding data transactions from a register.

22. The method of claim 21, further comprising programmably setting the data stored in the register to a new value.

23. The method of claim 18, further comprising not inhibiting performance of the read transaction if the total number of outstanding transactions is less than the maximum allowable number of outstanding data transactions.

24. The method of claim 23, further comprising increasing the number of outstanding data transactions by a number of data transactions initiated by the read request in response to not inhibiting performance of the read transaction.

25. The method of claim 18, wherein different read transactions include different numbers of data transactions on the interconnect.

26. The method of claim 18, further comprising determining a number of data transactions initiated by the read request and adding the number of data transactions to a current number of outstanding data transactions to produce the number of outstanding data transactions.

27. The method of claim 18, further comprising decreasing the number of outstanding data transactions each time a data transaction is performed.

28. The method of claim 18, further comprising operating the integrated circuit in a graphics system.

29. The method of claim 28, wherein said asserting a read request comprises asserting a read request for data store in a frame buffer.

30. The method of claim 28, wherein said asserting a read request comprises asserting a read request for data stored in a texture buffer.

31. The method of claim 18, comprising inhibiting performance of the read transaction by inhibiting performance of the data transactions initiated by the read request.

* * * * *

UNITED STATES PATENT AND TRADEMARK OFFICE
CERTIFICATE OF CORRECTION

PATENT NO. : 6,731,292 B2 Page 1 of 1
DATED : May 4, 2004
INVENTOR(S) : Burk et al.

It is certified that error appears in the above-identified patent and that said Letters Patent is hereby corrected as shown below:

Column 13,
Lines 64-67, please delete "an interconnect coupled to perform one or more data transactions to transmit the data from one of the one or more interfaces to one or more of the plurality is of components;" and substitute -- an interconnect coupled to perform one or more data transactions to transmit the data from one of the one or more interfaces to one or more of the plurality is of components; --.

Column 16,
Lines 25-27, please delete "The method of claim 28, wherein said asserting a read request comprises asserting a read request for data store in a frame buffer," and substitute -- The method of claim 28, wherein said asserting a read request comprises asserting a read request for data stored in a frame buffer. --.
Line 31, please delete "The method of claim 18, comprising" and substitute -- The method of claim 18, further comprising --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,731,292 B2
DATED : May 4, 2004
INVENTOR(S) : Burk et al.

It is certified that error appears in the above-identified patent and that said Letters Patent is hereby corrected as shown below:

Column 13,
Lines 64-67, please delete "an interconnect coupled to perform one or more data transactions to transmit the data from one of the one or more interfaces to one or more of the plurality is of components;" and substitute -- an interconnect coupled to perform one or more data transactions to transmit the data from one of the one or more interfaces to one or more of the plurality of components; --.

Column 16,
Lines 25-27, please delete "The method of claim 28, wherein said asserting a read request comprises asserting a read request for data store in a frame buffer." and substitute -- The method of claim 28, wherein said asserting a read request comprises asserting a read request for data stored in a frame buffer. --.
Line 31, please delete "The method of claim 18, comprising" and substitute -- The method of claim 18, further comprising --.

This certificate supersedes Certificate of Correction issued August 10, 2004.

Signed and Sealed this

Ninth Day of November, 2004

JON W. DUDAS
*Director of the United States Patent and Trademark Office*